(12) United States Patent
Moenkemoeller

(10) Patent No.: US 9,261,347 B2
(45) Date of Patent: Feb. 16, 2016

(54) SYSTEM AND SENSOR FOR MEASURING A DISTANCE TO A MAGNETIC ALTERNATING FIELD SOURCE

(71) Applicant: Ralf Moenkemoeller, Bielefeld (DE)

(72) Inventor: Ralf Moenkemoeller, Bielefeld (DE)

(73) Assignee: paragon AG, Delbrueck (DE)

( * ) Notice: Subject to any disclaimer, the term of this patent is extended or adjusted under 35 U.S.C. 154(b) by 210 days.

(21) Appl. No.: 13/687,015

(22) Filed: Nov. 28, 2012

(65) Prior Publication Data
US 2013/0154621 A1   Jun. 20, 2013

(30) Foreign Application Priority Data

Dec. 14, 2011   (DE) .......................... 10 2011 121 028

(51) Int. Cl.
*G01B 7/14*   (2006.01)
*B60G 17/019*   (2006.01)

(52) U.S. Cl.
CPC ................ *G01B 7/14* (2013.01); *B60G 17/019* (2013.01); *B60G 2400/25* (2013.01); *B60G 2401/17* (2013.01)

(58) Field of Classification Search
CPC ...... G01B 7/003; B60L 13/06; B60L 2200/26
USPC ......... 324/207.11, 207.12, 207.13; 178/18.01
See application file for complete search history.

(56) References Cited

U.S. PATENT DOCUMENTS

| | | | | |
|---|---|---|---|---|
| 5,589,775 A | * | 12/1996 | Kuckes | 324/346 |
| RE36,569 E | * | 2/2000 | Kuckes | 324/346 |
| 8,664,942 B2 | * | 3/2014 | May | 324/207.17 |
| 2003/0155910 A1 | * | 8/2003 | Bartingale et al. | 324/207.24 |
| 2005/0077989 A1 | * | 4/2005 | Edmonson | 335/207 |
| 2009/0116151 A1 | * | 5/2009 | Nakagawa et al. | 360/313 |
| 2009/0273340 A1 | * | 11/2009 | Stephanson et al. | 324/202 |

FOREIGN PATENT DOCUMENTS

DE   102006046372 B   4/2008

* cited by examiner

*Primary Examiner* — Tung X Nguyen
*Assistant Examiner* — Dominic Hawkins
(74) *Attorney, Agent, or Firm* — Andrew Wilford

(57) ABSTRACT

A measuring system for determining the distance to a magnetic alternating field source, with a magnetic sensor arrangement, by means of which a characteristic magnetic alternating field signal of the magnetic alternating field source can be recorded, and an evaluation device connected with the magnetic sensor arrangement and by means of which the characteristic magnetic alternating field signals of the magnetic alternating field source recorded by the magnetic sensor arrangement can be evaluated and converted into the distance between the magnetic alternating field source on the one hand and the magnetic sensor arrangement on the other.

4 Claims, 2 Drawing Sheets

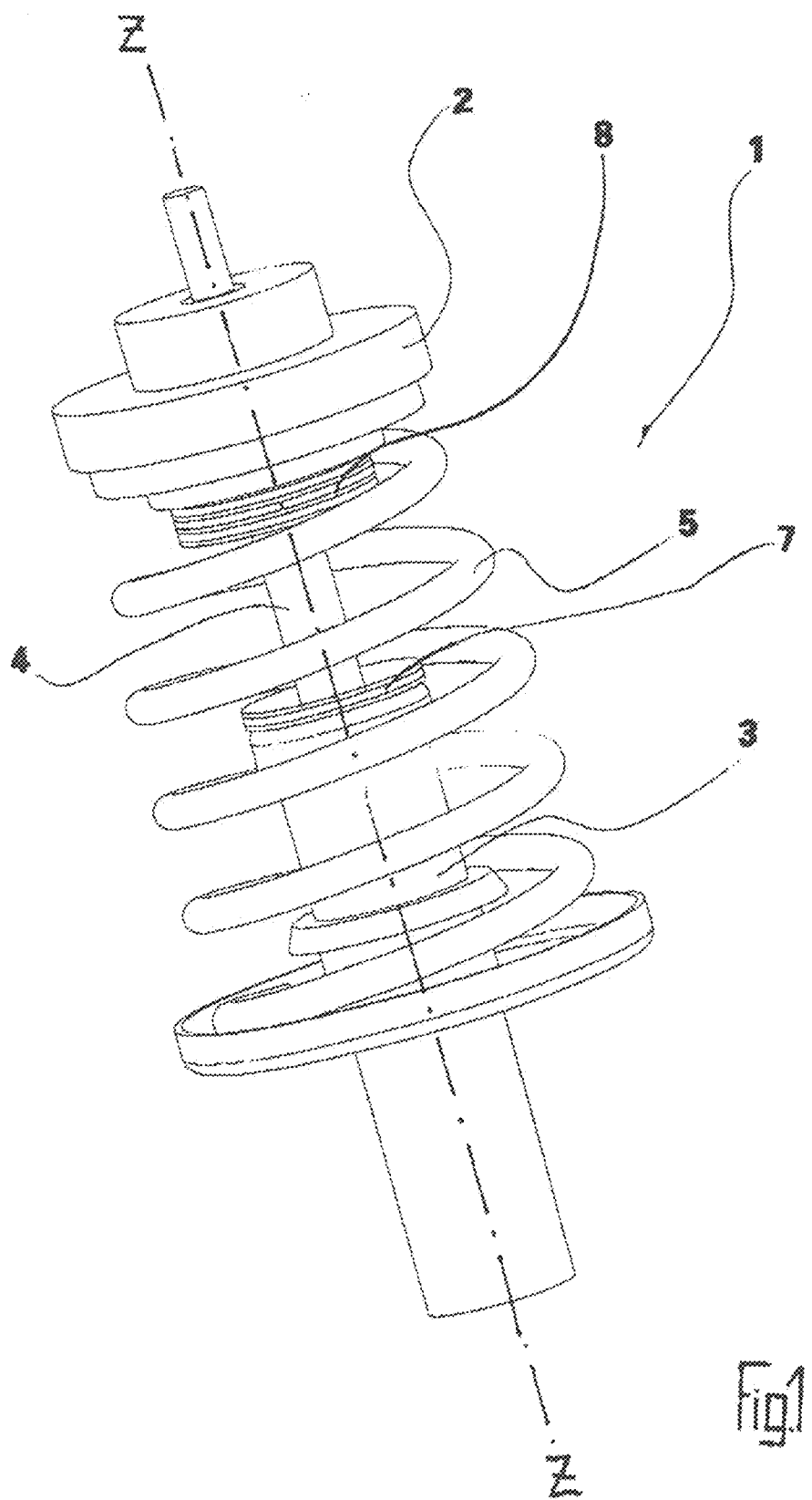

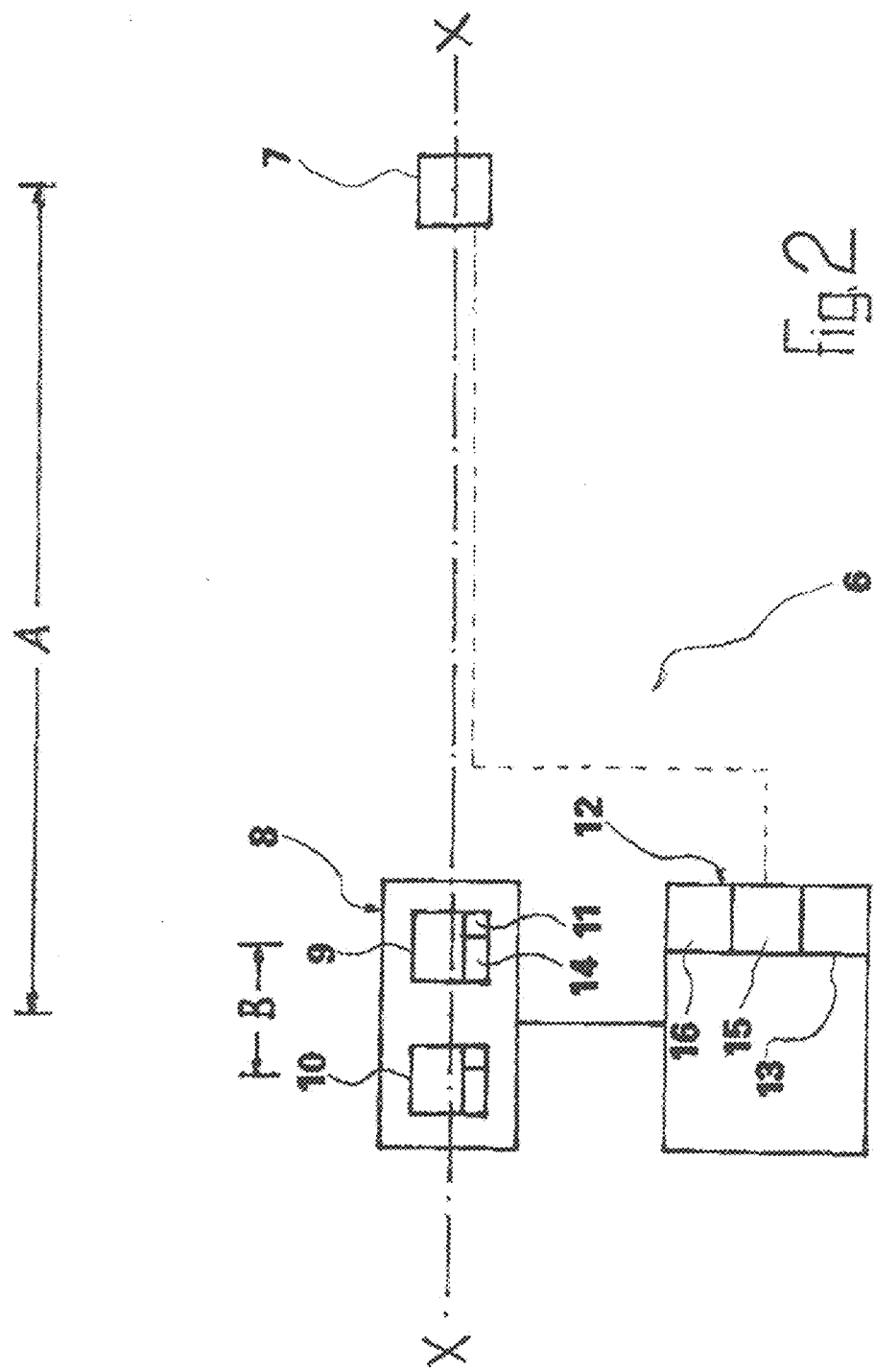

SYSTEM AND SENSOR FOR MEASURING A DISTANCE TO A MAGNETIC ALTERNATING FIELD SOURCE

FIELD OF THE INVENTION

The invention relates to a measuring system for determining the distance to a magnetic alternating field source, with a magnetic sensor arrangement by means of which a characteristic magnetic alternating field signal of the magnetic alternating field source is recordable, and with an evaluation device which is connected to the magnetic sensor arrangement and by means of which the characteristic magnetic alternating field signals of the magnetic alternating field source can be evaluated and converted into the distance between the magnetic alternating field source on the one hand and the magnetic sensor arrangement on the other, as well as to a corresponding method for measuring the distance between a magnetic sensor arrangement and an alternating field source, with which by means of the magnetic sensor arrangement a characteristic magnetic alternating field signal of the magnetic alternating field source is recorded, forwarded to an evaluation device and converted into the distance in the evaluation device.

BACKGROUND OF THE INVENTION

A measuring system for determining the distance to a magnetic alternating field source is for example known from the DE 10 2006 046 372 63, where a reference field source associated with the magnetic alternating field source is provided, which is arranged at a fixed distance to the magnetic alternating field source or to the magnetic sensor arrangement provided for measuring the distance.

OBJECT OF THE INVENTION

The object of the invention is to provide a measuring system for determining the distance to a magnetic alternating field source or a corresponding method, with which distances can be reliably and accurately recorded within in range from millimeters to a few hundred centimeters at comparatively little technical and constructional expense.

SUMMARY OF THE INVENTION

According to the invention, as regards the measuring system for determining the distance to a magnetic alternating field source, this requirement is met in that the magnetic sensor arrangement comprises at least two magnetic field sensors which are arranged at a fixed distance relative to each other on an axis of movement, on and along which the magnetic alternating field source is movable with respect to the magnetic sensor arrangement, and in that in the evaluation device the characteristic magnetic alternating field signals recorded in the at least two magnetic field sensors can be received and set into a relationship to each other and in that this relationship (ratio) between the at least two characteristic magnetic alternating field signals can be converted into the distance between the magnetic alternating field source on the one hand and the magnetic sensor arrangement on the other.

With regard to the method for measuring the distance between a magnetic sensor arrangement and a magnetic alternating field source the requirement according to the invention is met in that the characteristic magnetic alternating field signal is recorded by means of at least two magnetic field sensors arranged at a fixed distance to each other on an axis of movement of the magnetic alternating field source, and in that in the evaluation device the characteristic magnetic alternating field signals of the at least two magnetic field sensors are recorded and set into a relationship to each other and the relationship (ratio) is converted into the distance between the magnetic alternating field source on the one hand and the magnetic sensor arrangement on the other.

By means of the above described measuring system or the above described measuring system for determining the distance to a magnetic alternating field source it is possible to accurately and reliably measure the distance safely and without wear between various parts of, for example, a chassis of a motor vehicle without any additional moving elements. The measurements taken are accurate within a range starting from millimeters up to a few hundred centimeters.

According to one advantageous embodiment of the measuring system according to the invention the evaluation device of the same is designed such that the ratio of the at least two characteristic magnetic alternating field signals can be formed analogue-technically and transformed into a distance-dependent voltage.

To this end the two characteristic magnetic alternating field signals are logarithmized, then subtracted, wherein the difference resulting from the subtraction is again immediately delogarithmized. The delogarithmization may be waived in certain cases, i.e. then, when the application arranged downstream of the evaluation device is able to work with logarithmic path or distance information.

Alternatively it is possible to equip the evaluation device with a microprocessor or micro controller by means of which the ratio of the at least two characteristic magnetic alternating field signals can be calculated and the determined distance assigned to the calculated ratio. This then involves analogue signal pre-processing prior to processing the signal in the microprocessor or micro controller, by means of which the characteristic magnetic alternating field signals are transformed by amplification and/or logarithmization into a voltage range which is suitable for the microprocessor or micro controller. Forming the ratio or the quotient and assigning it to a distance is then performed digital-technically in the microprocessor or micro controller.

It is possible to store a table in the evaluation is device by means of which the determined distance can be assigned to the calculated ratio of the at least two characteristic magnetic alternating field signals, wherein the stored table may be designed specifically for the respective application.

Each magnetic field sensor may have an amplifier, preferably a lock-in amplifier, and/or a filter, preferably a lock-in filter, assigned to it, wherein by means of the filter, external signal components may be removed from the recorded characteristic magnetic alternating field signals. According to one advantageous embodiment of the measuring system according to the invention its magnetic sensor arrangement is arranged on a body, in relation to which a second body is movable which has the magnetic alternating field source arranged on it. These two components may be, for example, components of a shock-absorber device, which are movable toward each other along an axis.

According to one advantageous embodiment of the method according to the invention for measuring the distance between a magnetic sensor arrangement and a magnetic alternating field source the ratio of the at least two characteristic magnetic alternating field signals is designed analogue-technically and transformed into a distance-dependent voltage.

Alternatively it is possible to calculate the ratio of the at least two characteristic magnetic alternating field signals by means of a microprocessor or micro controller of the evaluation device and to assign these to the distance.

BRIEF DESCRIPTION OF THE DRAWING

The invention will now be explained in detail by way of one embodiment with reference to the drawing, in which FIG. 1 shows a shock-absorber device of a motor vehicle for example, with an embodiment of a measuring system according to the invention; and FIG. 2 shows a principal representation of an embodiment of the measuring system according to the invention for determining the distance between two components of the shock-absorber device, which are movable toward each other along an axis.

DETAILED DESCRIPTION

A shock-absorber device 1 as shown in FIG. 1 is widely used in particular in the automotive industry and is typically used in cases where various chassis components shall be arranged so as to be movable at a specifiable distance in relation to each other.

The embodiment of the shock-absorber device 1 shown in FIG. 1 comprises two components 2, 3 arranged along an axis Z so as to movable in relation to each other. In the shown embodiment of the shock-absorber device 1 axis Z is formed by the shaft of a piston rod 4. Furthermore, the two components 2, 3 of the shock-absorber device 1 movable in relation to each other have a helical spring 5 arranged between them.

The shock-absorber device 1 shown in FIG. 1 is equipped with a measuring system 6 shown in principle in FIG. 2, which is used to determine the distance between the two components 2, 3 of the shock-absorber device 1, which components are movable along axis Z in relation to each other.

To this end a magnetic alternating field source 7 is provided on the lower component 3 of the shock-absorber device 1 in FIG. 1, which alternating field source is permanently fixed or attached to component 2, Component 2 of the shock-absorber device 1 has a magnetic sensor arrangement 8 arranged on it, which is also permanently fixed or attached to component 2. As regards the arrangement of the magnetic alternating field source 7 on component 3 and the magnetic sensor arrangement 9 on component 2, it is essential that these are placed on an axis of movement X shown in FIG. 2, which runs parallel to axis Z, along which the two components 2, 3 of shock-absorber device 1 are movable in relation to each other.

The magnetic alternating field source 7 generates an electromagnetic field of a known signal frequency. This is effected by means of a coil not shown in detail in the figures, such as a generator, wherein the coil is immovably connected with component 3 of the shock-absorber device 1.

The magnetic sensor arrangement 8 for measuring the electromagnetic field of the magnetic alternating field source 7 is designed such that it is sensitive in the range corresponding to the range of the signal frequency of the magnetic alternating field source 7. As already mentioned the magnetic sensor arrangement 8 is immovably connected with component 2 of the shock-absorber device 1.

The magnetic sensor arrangement 8 is comprised of at least two magnetic field sensors 9, 10, These two magnetic field sensors 9, 10 may be designed at random as magnetic-field sensitive sensor elements, for example as Hall sensors, induction coils or as AMR, GMR or similar sensors.

The two magnetic field sensors 9, 10 of the magnetic sensor arrangement 8 are arranged at a fixed distance 13 in relation to each on the axis of movement X shown in FIG. 2 of the magnetic alternating field source 7. Thus the two magnetic field sensors 9, 10 of the magnetic sensor arrangement and the magnetic alternating field source 7 are all arranged on the axis of is movement X shown in FIG. 2.

The characteristic magnetic alternating field signal of the magnetic alternating field source 7 received by the two magnetic field sensors 9, 10 of magnetic sensor arrangement 8 is separated from external signal components by means of a filter such as by means of a lock-in filter 11.

At this point it should be noted that the field strength of a magnetic field at close range in air drops at a factor of 1/r, where r signifies the distance between the source of the magnetic field on the one hand and the magnet-sensitive sensor element on the other. It is also known that the gradient of a magnetic field at close range in air drops at a factor of 1/r4.

Since the quotient or the ratio is formed from the two characteristic magnetic alternating field signals of the magnetic alternating field source 7 received by the two magnetic field sensors 9, 10 of the magnetic sensor arrangement 6, a distance-dependent value is received which is independent of the field strength of the magnetic alternating field source 7.

With regard to signal processing and signal evaluation the measuring system 6 comprises an evaluation device 12, which is assigned to, or connected to, the magnetic sensor arrangement 8 provided on component 3 of the shock-absorber device 1.

The quotient or the ratio of the two characteristic magnetic alternating field signals recorded by the two magnetic field sensors 9, 10 of the magnetic sensor arrangement B may be formed analogue-technically. To this end the two magnetic alternating field signals are logarithmized, then subtracted, wherein the difference resulting from this subtraction is then again delogarithmized. As a result a linear distance-dependent voltage is made available.

The above-mentioned delogarithmization may be waived if the downstream application is able to work with logarithmized path information. Alternatively it is possible to perform the signal evaluation or processing by means of a microprocessor or micro controller. Prior to processing the characteristic magnetic alternating field signals in the microprocessor or micro controller 13, analogue signal preprocessing is performed. 3y means of this signal-preprocessing the characteristic magnetic alternating field signals are transformed by amplification and/or logarithmization into a voltage range suitable for the microprocessor or micro controller 13. Forming the quotient or the ratio and assigning the determined value to a distance or a gap A between the magnetic alternating field source 7 on the one hand and the magnetic sensor arrangement on the other, and thus between the two components 2, 3 of the shock-absorber device 1 is then performed digital-technically in the microprocessor or micro controller 13.

The above-mentioned amplification may be effected for example by means of a lock-in amplifier 14.

With the embodiment of the measuring system 6 according to the invention and shown in FIGS. 1 and 2, a further technical improvement is achieved in that the characteristic magnetic alternating field signal of the magnetic alternating field source 7 or the transmission signal of the magnetic alternating field source 7 is a carrier signal modulated with a useful signal, preferably an amplitude-modulated signal. The magnetic alternating field source 7 is supplied with the carrier signal by means of an evaluation device 12 of the control unit 15 assigned to the measuring system 6 in the embodiment shown. The frequency of the carrier signal supplied to the magnetic alternating field source 7 is considerably larger, typically a hundred times larger, than the frequency of a low-frequency useful signal which corresponds to the characteristic magnetic alternating field signal of the magnetic alternating field source 7.

Due to the high frequency of the carrier signal a good magnetic coupling is achieved, wherein signal processing of the low-frequency useful signal is possible in the low-frequency range. Recovery of the useful signal corresponding to the characteristic magnetic alternating field signal may be effected by means of any known demodulation procedure in a demodulation stage 16 provided in the evaluation device 12. Due to processing the useful signal in the low-frequency range it is possible to design the microprocessor or micro controller 13 of the evaluation device 12 so as to be relatively slow and thus to be good value for money.

In a case where the measuring system 6 is arranged on a shock-absorber device, the gradient ascertained during evaluation of the characteristic magnetic alternating field signals of the magnetic alternating field source 7 is considerably impacted by the piston rod 4 which usually consists of ferromagnetic steel. Accordingly this gradient of the characteristic magnetic alternating field signal is different from the corresponding gradient of the characteristic magnetic alternating field signal in air. Insofar an application-specific distance table is stored for example in the magnetic sensor arrangement 8 or the evaluation device 12, in order to perform the necessary adjustments.

In order to increase operational reliability of the above-described measuring system 6 according to the invention and in order to ensure trouble-free operation, it is possible to design the evaluation device 12 in such a way that the frequency of the carrier signal supplied to the magnetic alternating field source 7 can be switched over by means of its control unit 15. This will allow measurements to be carried out with different frequencies of the carrier signal. A simple voting algorithm is stored in the evaluation device 12, by means of which it is possible to draw the conclusion that in all probability the characteristic magnetic alternating field signal is interference-free.

When operating the shock-absorber device 1, the field strength of the magnetic alternating field source 7 may vary considerably, for example due to temperature influences. Based on the measurements taken of the signal voltages using the measuring system 6 according to the invention, and the forming of the ratio or the quotient from the characteristic magnetic alternating field signals received in the two magnetic field sensors 9, 10 of the magnetic sensor arrangement 8, the distance measurement will be highly accurate and it will be independent of the absolute field strength of the magnetic alternating field source 7.

If, for example, levelling of a motor vehicle is to be carried out when at a standstill, it is possible to perform the above-described method of measuring, evaluating and processing by means of an inexpensive microprocessor or micro controller, wherein the characteristic magnetic alternating field signals of both magnetic field sensors 9, 10 can be taken into consideration.

If, however, dynamic movements of chassis components shall be recorded whilst the motor vehicle is being driven, it is necessary for the above-described measuring system or the downstream application units to be able to work with movement frequencies of approx. 20 to 30 Hz. Therefore the above-described measuring system according to the invention can be operated in two operating modes.

In the first operating mode, the distance A is ascertained by means of the evaluation device 12 on the basis of the characteristic magnetic alternating field signals of the magnetic alternating field source 7 recorded by the at least two magnetic field sensors 9, 10, wherein when taking measurements in the first operating mode, the absolute values of the measured voltages are recorded and the quotient or the repeatedly mentioned ratio is formed in order to obtain distance information which is independent of the absolute field strength of the magnetic alternating field source 7, in form of distance A.

From the data obtained this way, conclusions can be drawn as to the momentary absolute field strength of the magnetic alternating field source 7. In the following second operating mode of measuring system 6 only one characteristic magnetic alternating field signal of one of the two magnetic field sensors 9, 10 can be recorded if a quick and dynamic measurement is to be obtained. This recorded characteristic magnetic alternating field signal is scaled according to the derived or calculated absolute field strength or source field strength of the magnetic alternating field source 7 and then assigned to the respective resulting distance between the magnetic sensor arrangement 8 on the one hand and the magnetic alternating field source 7 on the other.

The switch-over between the different operating modes of measuring system 6 may be effected by an external control signal or by an algorithm stored in the signal processing unit of the evaluation device 12.

The invention claimed is:

1. A method of operating a system for measuring a distance between two parts spaced apart along an axis, the method comprising the steps of:
   providing a magnetic alternating field source on the axis and on one of the parts;
   fixing a pair of magnetic sensors on the axis and at a spacing from each other along the axis on the other of the parts, the sensors being capable of detecting and determining a strength of a field generated by the source; and thereafter
   in a first operating mode,
      detecting the field of the source with each of the sensors and deriving therefrom respective field-strength outputs, and
      comparing the derived field-strength outputs with each other to produce an absolute value for the distance along the axis between the two parts; and
   in a subsequent second operating mode
      detecting the field of the source with only one of the sensors and deriving therefrom a single field-strength output, and
      scaling the single-field strength output against the absolute value to again determine the distance along the axis between the two parts.

2. The measuring method defined in claim 1, wherein each of the field-strength outputs is a voltage.

3. The measuring method defined in claim 1, wherein the field-strength outputs are compared by forming a ratio between them.

4. The measuring method defined in claim 3, further comprising for the second operating mode the step of:
   storing a table in the microprocessor or micro controller of an evaluation device by means of which the determined distance can be assigned to the ratio.

* * * * *